(12) United States Patent
Carlson

(10) Patent No.: US 6,317,772 B1
(45) Date of Patent: Nov. 13, 2001

(54) SPLIT REMAINDER DIVIDER

(75) Inventor: David A. Carlson, Hudson, MA (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/234,021

(22) Filed: Jan. 19, 1999

(51) Int. Cl.[7] ................................................ G06F 7/50
(52) U.S. Cl. ................................. 708/655; 708/656
(58) Field of Search .......................... 708/655, 656, 708/504

(56) References Cited

U.S. PATENT DOCUMENTS

| | | | |
|---|---|---|---|
| 5,258,944 | 11/1993 | Smith | 364/748 |
| 5,784,307 | * 7/1998 | Sheaffer | 708/655 |
| 5,818,745 | * 10/1998 | Sheaffer | 708/656 |
| 5,870,323 | * 2/1999 | Prabhu et al. | 708/656 |
| 6,108,682 | * 8/2000 | Matheny | 708/656 |

\* cited by examiner

*Primary Examiner*—David H. Malzahn
(74) *Attorney, Agent, or Firm*—Hamilton, Brook, Smith and Reynolds, P.C.

(57) ABSTRACT

The invention provides computer apparatus for performing a division operation having a dividend mathematically divided by a divisor. The dividend and the divisor are split between a state machine and an array of carry save adders. The most significant bits of the dividend and the divisor are input to the state machine and the least significant bits of the dividend and the divisor are input to the carry save adder array. The state machine is fully encoded with partial remainder values and quotient digit values for all possible combinations of the most significant bits of the divisor and the dividend. The carry save adders add the respective least significant bits of the dividend and the divisor and output spillover signals to the state machine. The state machine provides partial remainders and quotient digits selected from the encoded partial remainder values and quotient digit values dependent on (i.e. as a function of) the most significant bits of the dividend, divisor and the spillover signals.

20 Claims, 7 Drawing Sheets

SPLIT REMAINDER DIVIDER

BACKGROUND OF THE INVENTION

Generally mathematical division in a computer involves division of a dividend by a divisor to produce a quotient. Such division is slow because it requires iteratively generating a series of partial remainders and quotient digits. Therefore, the speed of the division operation is dependent on the amount of time it takes to complete one iteration and the total number of iterations required. The total number of iterations is dependent on the number of quotient digits required to provide an accurate quotient. For example, in floating point division twenty-five quotient digits are required for single precision and fifty-four quotient digits are required for double-precision, therefore the time required to generate each of the required quotient digits is critical to the speed of the division.

One well known method of performing division is restorative division. A computer procedure or routine for performing binary restorative division is shown in Table 1.

If($R_i$>=Divisor) then $R_{i+1}$=2*($R_i$−Divisor) $Q_i$=1

Else $R_{i+1}$=2*($R_i$) $Q_i$=0 where $R_i$=partial remainder; $Q_i$=quotient digit

Table 1

In binary restorative division, quotient digits are selected from the set of two possible quotient digits {0, 1}. In each iteration, a partial remainder is compared to a divisor. If the partial remainder is greater than or equal to the divisor, the quotient digit is set to '1'. The partial remainder for the next iteration is set equal to a left shift, by one bit, of the result of the divisor subtracted from the current partial remainder. If the current partial remainder is less than the divisor, the quotient digit is set to '0'. In the next iteration, the partial remainder is set equal to a left shift by one bit of the current partial remainder.

For example, to divide dividend=1.01 by divisor=1.1 using the restoring division routine in Table 1 results in quotient=0.1101. The division operation requires the generation of five partial remainders and five quotient digits as shown in Table 2.

TABLE 2

| Division Stage | Partial Remainder(in) | Partial Remainder(out) | Quotient Digit |
|---|---|---|---|
| 1 | 1.01 | 10.10 | 0 |
| 2 | 10.10 | 10.00 | 1 |
| 3 | 10.00 | 1.00 | 1 |
| 4 | 1.00 | 10.00 | 0 |
| 5 | 10.00 | 1.00 | 1 |
| 6 | 1.00 | | |

To generate the quotient digits, the partial remainder must be calculated precisely in each iteration. Therefore, the subtraction of the divisor from the partial remainder requires propagating a carry bit from the least significant bit ("LSB") to the most significant bit ("MSB") of the partial remainder, through the use of a Carry Propagate Adder ("CPA"). Due to the requirement to propagate the carry bit, the subtraction is relatively slow.

For example, to subtract divisor=1.1 from partial remainder=10.1 in division Stage 2 as shown in Table 2, requires propagating the carry bit from the LSB(bit #0) to MSB(bit#3) of the CPA.

Another well known method for performing division is non-restoring division in which a quotient is provided in redundant form. For example, in a binary non-restoring divider, quotient digits are selected from redundant binary sets of quotient digits such as, the set of redundant binary digits {−1, 0, 1} or the set of redundant binary digits {−2, −1, 0, 1, 2}. A routine for selecting a quotient digit in a binary non-restoring divider from the set of redundant binary digits {−1, 0, 1} is shown in Table 3.

If($R_i$>=0.5Divisor); $Q_i$=1

If(0<$R_i$<0.5Divisor); $Q_i$=1, 0

If(−0.5Divisor<$R_i$<0); $Q_i$=−1, 0

If(−0.5Divisor<=$R_i$); $Q_i$=−1

$R_{i+1}$=2*($R_i$−$Q_i$Divisor)

where $R_i$=partial remainder; $Q_i$=quotient digit

Table 3

Non-restoring division generates a quotient digit by real-time comparison of the divisor to a small number of the partial remainder MSBs. The quotient digit generation does not require a precise subtraction of the divisor from the input partial remainder therefore Carry Save Adders ("CSAs") can be used. The CSAs save the carry bits and do not require propagating a carry bit from the LSB to the MSB of the partial remainder. As a result, subtraction using CSAs is much faster than subtraction using a CPA.

For example, dividing dividend=1.01 by divisor=1.1 using non-restoring division results in redundant binary quotient digits=1,0,−1,1,−1. The division requires the generation of five partial remainders and quotient digits as shown in Table 4.

TABLE 4

| Division Stage | Partial Remainder(in) | Partial Remainder(out) | Quotient Digit |
|---|---|---|---|
| 1 | 1.01 | −0.1 | 1 |
| 2 | −0.10 | −1.0 | 0 |
| 3 | −1.00 | 1.0 | −1 |
| 4 | 1.00 | −1.0 | 1 |
| 5 | −1.00 | 1.0 | −1 |

The quotient=0.1101 is generated from the redundant binary quotient digits as shown in Table 5. A normalized scaled quotient digit is generated from each redundant binary quotient digit, by shifting the redundant binary quotient digit, and multiplying the result by −1. After the normalized scaled quotient digits have been generated, they are added to generate the quotient.

TABLE 5

| Division Stage | Redundant Binary Quotient Digit (from Table 4) | Normalized Scaled Quotient Digit |
|---|---|---|
| 1 | −1 | 1.0 |
| 2 | 0 | 0.0 |
| 3 | 1 | −0.01 |
| 4 | −1 | 0.001 |
| 5 | 1 | −0.0001 |
| | Quotient = | 0.1101 |

In sum, the comparison of the divisor to the partial remainder is relatively fast in restoring division, but the subtraction to provide the precise partial remainder is relatively slow because it requires the use of a CPA. The comparison of the divisor to the partial remainder is relatively slow in non-restoring division, but the subtraction using CSAs is relatively fast.

Therefore, non-restoring division has slow comparison and fast CSAs, and restoring division has a slow CPA and fast comparison. The tradeoff between comparison speed and subtraction speed (CPA and CSAs) is a long standing issue faced by computer divider designers.

SUMMARY OF THE INVENTION

In a computer system, a mathematical division operation is performed by a state machine coupled to an array of CSAs for dividing a dividend by a divisor. The most significant bits of the dividend and the divisor are input to the state machine. The least significant bits of the dividend and the divisor are input to the array of carry save adders.

In the array of carry save adders there is a different carry save adder for each least significant bit of the dividend. For a given least significant bit of the dividend, the least significant bit of the dividend and a respective least significant bit of the divisor are summed in the respective carry save adder.

The state machine is coupled in parallel to the array of carry save adders. The state machine includes at least one state machine stage which is fully encoded for all possible combinations of the most significant bits of the dividend and the divisor. The state machine stage provides a quotient digit and the most significant bits of a partial remainder dependent on the most significant bits of the dividend and the divisor.

The most significant bits of the partial remainder provided by the state machine stage are also dependent on the addition of spillover signals generated by the carry save adder. The spillover signals are added in the state machine by selecting the encoded partial remainder set equal to the result of the mathematical addition.

To generate more quotient digits the most significant bits of the partial remainder are fed back to the input of the state machine, as the next stage dividend. The state machine may be fully encoded for quotient digits from the redundant binary set {−1, 0, 1} or from the redundant binary set {−2, −1, 0, 1, 2}. A fully encoded state machine for quotient digits from the redundant binary set {−1, 0, 1} sets the quotient digit to −1 if the partial remainder is greater than half the divisor. If the partial remainder is less than or equal to half of the divisor, the state machine sets the quotient digit to one or zero. If the partial remainder is greater than or equal to minus half the divisor, the state machine sets the quotient digit to minus one or zero. If the partial remainder is less than minus half the divisor, the state machine sets the quotient digit to one.

The number of state machine stages is equal to the number of carry save stages. In the preferred embodiment, six carry save stages are employed such that, there are six state machine stages.

The present invention methodology thus includes the steps of providing a carry save adder array and a state machine coupled in parallel to the carry save adder array for dividing a dividend by a divisor. The carry save adder array includes at least one carry save adder stage for holding the least significant bits in the dividend and the divisor. The state machine includes at least one state machine stage for holding the most significant bits of the divisor and the dividend.

Summing in each carry save adder a respective least significant bit of the dividend and a respective least significant bit of the divisor. Encoding partial remainder values and quotient digits for all possible combinations of the most significant bits of the dividend and the divisor in the state machine stage. Selecting the quotient bit and the most significant bits of the partial remainder dependent on the most significant bits of the dividend and the divisor.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
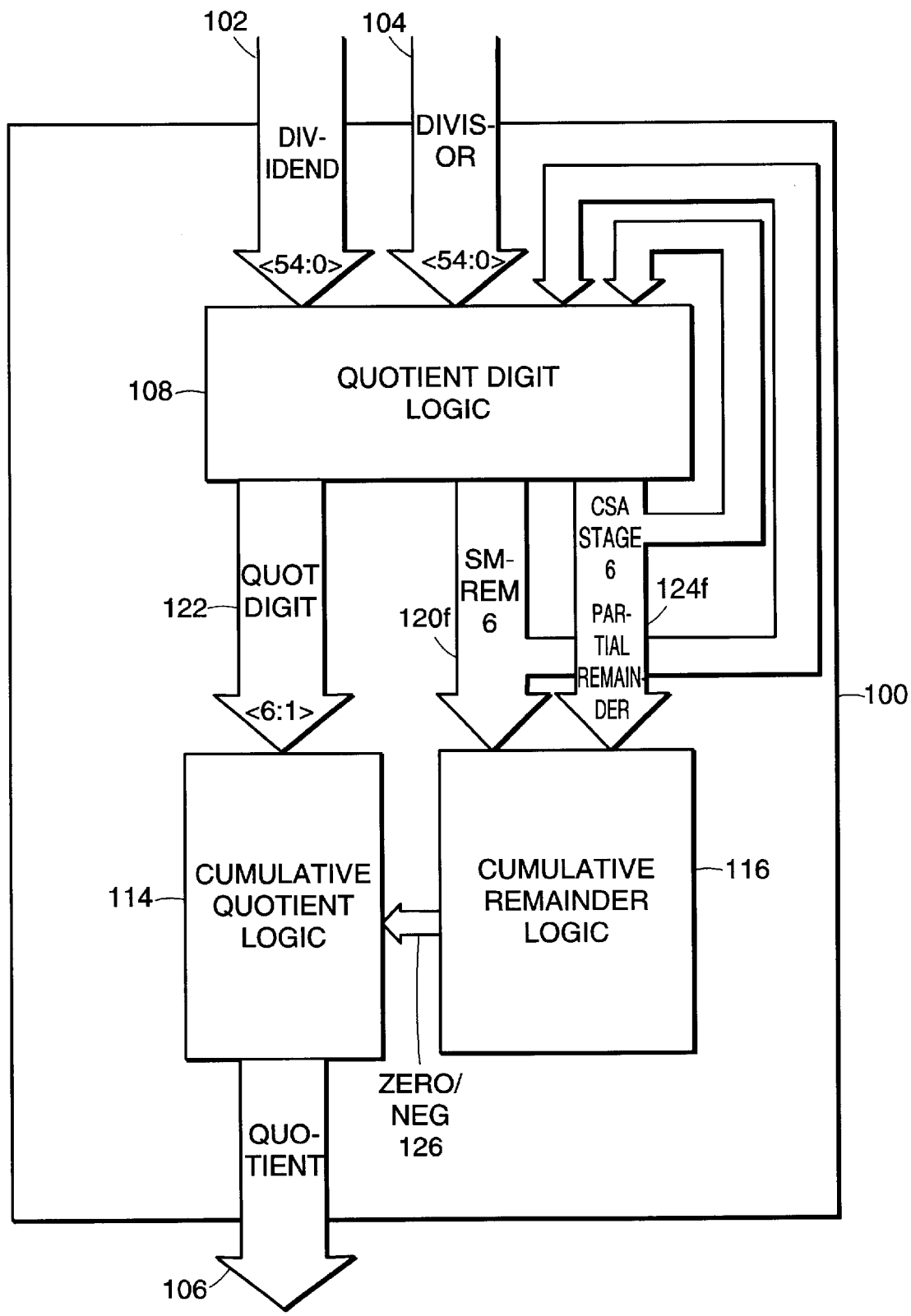
FIG. 1 is a block diagram illustrating an embodiment of a split remainder divider according to the principles of the invention.

Referring now to the drawings and particularly to FIG. 1 where there is shown an embodiment of a split remainder divider 100 according to the principles of this invention. The split remainder divider 100 shown in FIG. 1 includes quotient digit logic 108, cumulative remainder logic 116 and cumulative quotient logic 114.

A dividend 102 and a divisor 104 are input to the quotient digit logic 108. The quotient digit logic 108 performs a mathematical division of the dividend 102 and the divisor 104 by iteratively generating a series of state machine partial remainders 120f, CSA partial remainders 124f and quotient digits 122. In the embodiment shown in FIG. 1, six quotient digits 122 are generated in each cycle through the quotient digit logic 108, but any number of quotient digits 122 may be generated in each cycle. After each cycle through the quotient digit logic 108, the state machine partial remainder 120*f* and CSA array partial remainder 124*f* output from the quotient digit logic 108 are fed back to the input of the quotient digit logic 108.

The state machine partial remainder 120*f* and CSA array partial remainder 124*f* continue to be input to the quotient digit logic 108 until the required number of quotient digits 122 have been generated. For example, if the mathematical division is operating on binary floating point numbers, ten cycles through the quotient digit logic 108 shown in FIG. 1 are required, in order to generate the fifty-six quotient digits for double-precision floating point division.

The quotient digit logic 108 implements non-restorative division. In non-restorative division quotient digits 122 are selected from redundant binary sets. Redundant binary sets include more digits than the set of binary digits {0, 1}, for example, the set of digits {−1, 0, 1} or the set of digits {−2, −1, 0, 1, 2} are employed.

The state machine partial remainder 120*f* and CSA array partial remainder 124*f* output from the quotient digit logic 108 are input to the cumulative remainder logic 116. The cumulative remainder logic 116 determines from the state machine partial remainder 120*f* and the CSA array partial remainder 124*f* whether the combination of the state machine partial remainder 120*f* and the CSA array partial remainder 124*f* is negative, zero or positive. Negative/Zero signals 126 are input to the cumulative quotient logic 114 and enable the cumulative quotient logic 114 to determine the quotient 106.

The six quotient digits 122 generated in each cycle through the quotient digit logic 108 are input to the cumulative quotient logic 114. After the last cycle through the quotient digit logic 108, the cumulative quotient logic 114 generates the quotient 106 output from the split remainder divider 100 by serially adding the quotient digits 122 output from each cycle through the quotient digit logic 108. The Negative/Zero signals 126 from the cumulative remainder logic 116 are also used by the cumulative quotient logic 114 to generate the quotient 106. The cumulative quotient logic 114 also translates the quotient digits 122 from redundant binary digits to binary digits.

Figure 2:
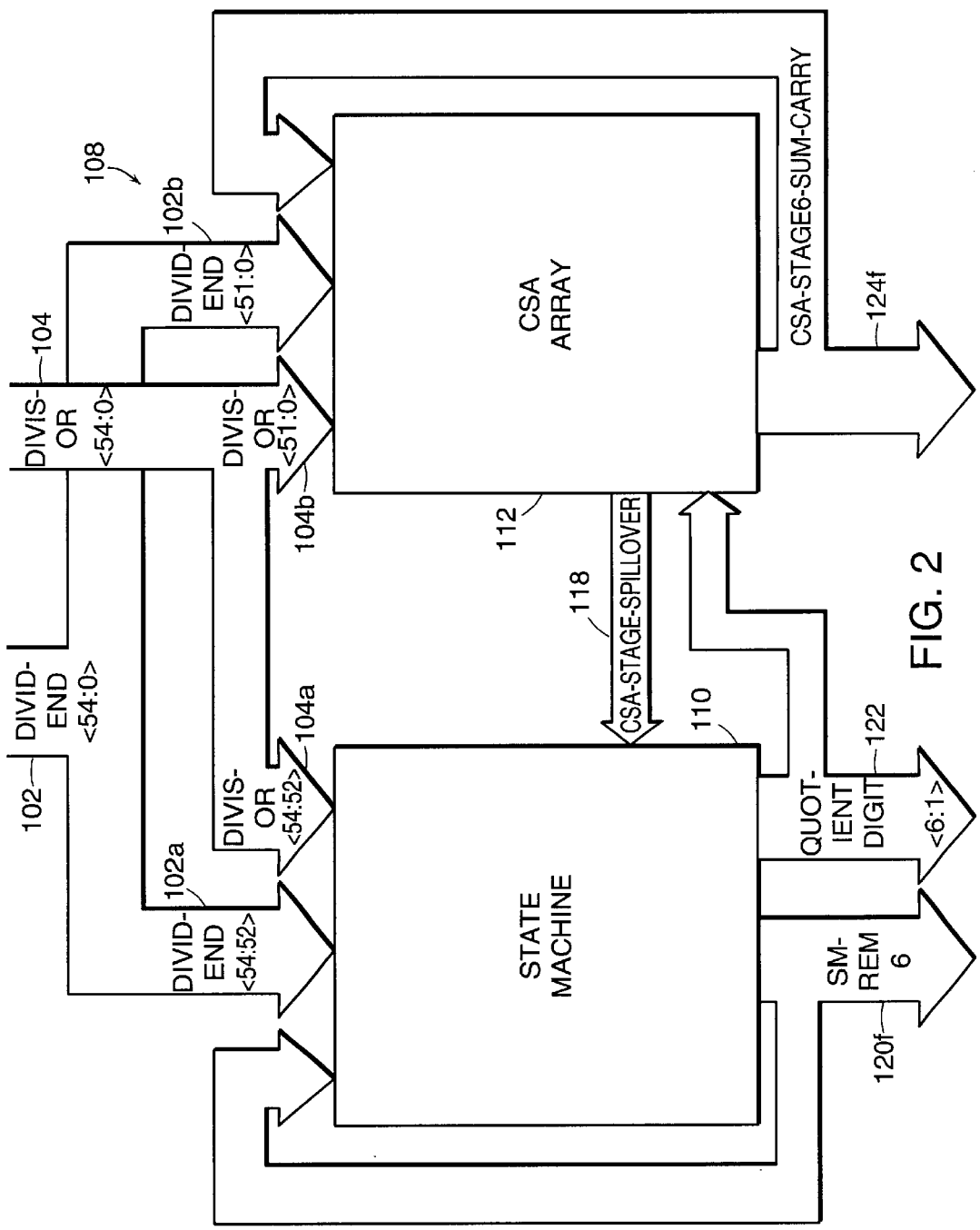
FIG. 2 is a block diagram of the quotient digit logic of the embodiment shown in FIG. 1.

Referring now to FIG. 2, the quotient digit logic 108 shown in FIG. 1 includes a state machine 110 and a CSA array 112. The dividend 102 input and divisor 104 input, are split between the state machine 110 and the CSA array 112. The dividend's most significant bits ("MSBs") 102*a* and the divisor's MSBs 104*a* are input to the state machine 110. The remaining bits of the dividend, the dividend's least significant bits ("LSBs") 102*b* and the remaining bits of the divisor, the divisor's LSBs 104*b* are input to the CSA array 112.

In the embodiment shown in FIG. 2, the dividend 102 has a total of fifty-five bits and the divisor 104 has a total of fifty-five bits. The number of bits in the dividend 102 and the divisor 104 is not limited to fifty-five bits. The fifty-five bits of both the dividend 102 and the divisor 104 are numbered from 0 to 54. The bits in the dividend 102 and the divisor 104 numbered 0 are referred to as the respective LSB. The bits numbered 54 in the dividend 102 and the divisor 104 are referred to as the respective MSB.

For illustrative purposes, the dividend 102 is split, such that three of the dividend's MSBs 102*a* (bits 54–52) are input to the state machine 110 and the fifty-two of the dividend's LSBs 102*b* (bits 51–0) are input to CSA array 112. The divisor 104 is split in the same ratio of bits as the dividend 102, with three of the divisor's MSBs 104*a* (bits 54–52) input to the state machine 110 and fifty-two of the divisor's LSBs 104*b* (bits 51:0) input to the CSA array 112. It is understood that the bits of the divisor 104 and the dividend 102 may be split in other ratios between the CSA array 112 and the state machine 110. For example, in Compaq Computer Corporation's PCA57 the four MSBs of the dividend 102 and the four MSBs of the divisor 104 are input to the state machine 110.

The number of the dividend's MSBs 102*a* to the state machine 110 is dependent on the size of the state machine 110 and degree of preciseness required. The degree of preciseness of the state machine 110 requires that quotient digits 122 are generated such that, the state machine precise remainder is bounded by +−2*divisor 104 (i.e. plus or minus twice the divisor 104). The size of the state machine 110 is dependent on the number of the dividend's MSBs 102*b* input to the state machine 110. For example, each bit of the dividend 102 added to the state machine 110 increases the size of the state machine 110 by a factor of two.

The state machine 10 and CSA array 112 perform non-restorative division in parallel on their respective bits of the dividend 102 and the divisor 104. After each cycle through the state machine 110 and the CSA array 112, the state machine partial remainder 120*f* is fed back to the input of the state machine 110, and the CSA array partial remainder 124*f* is fed back to the input to the CSA array 112. During each cycle through the state machine 110, the state machine 110 generates quotient digits 122. During each cycle through the CSA array 112, the CSA array 112 generates CSA spillover signals 118 from the dividend's MSBs 102*b*, the divisor's MSBs 104*b* and the quotient digits 122 generated in the state machine 110. The quotient digits 122 in the state machine 110 are generated from the dividend's MSBs 102*a*, the divisor's MSBs 104*a* and the CSA spillover signals 118 generated in CSA array 112.

Figure 3:
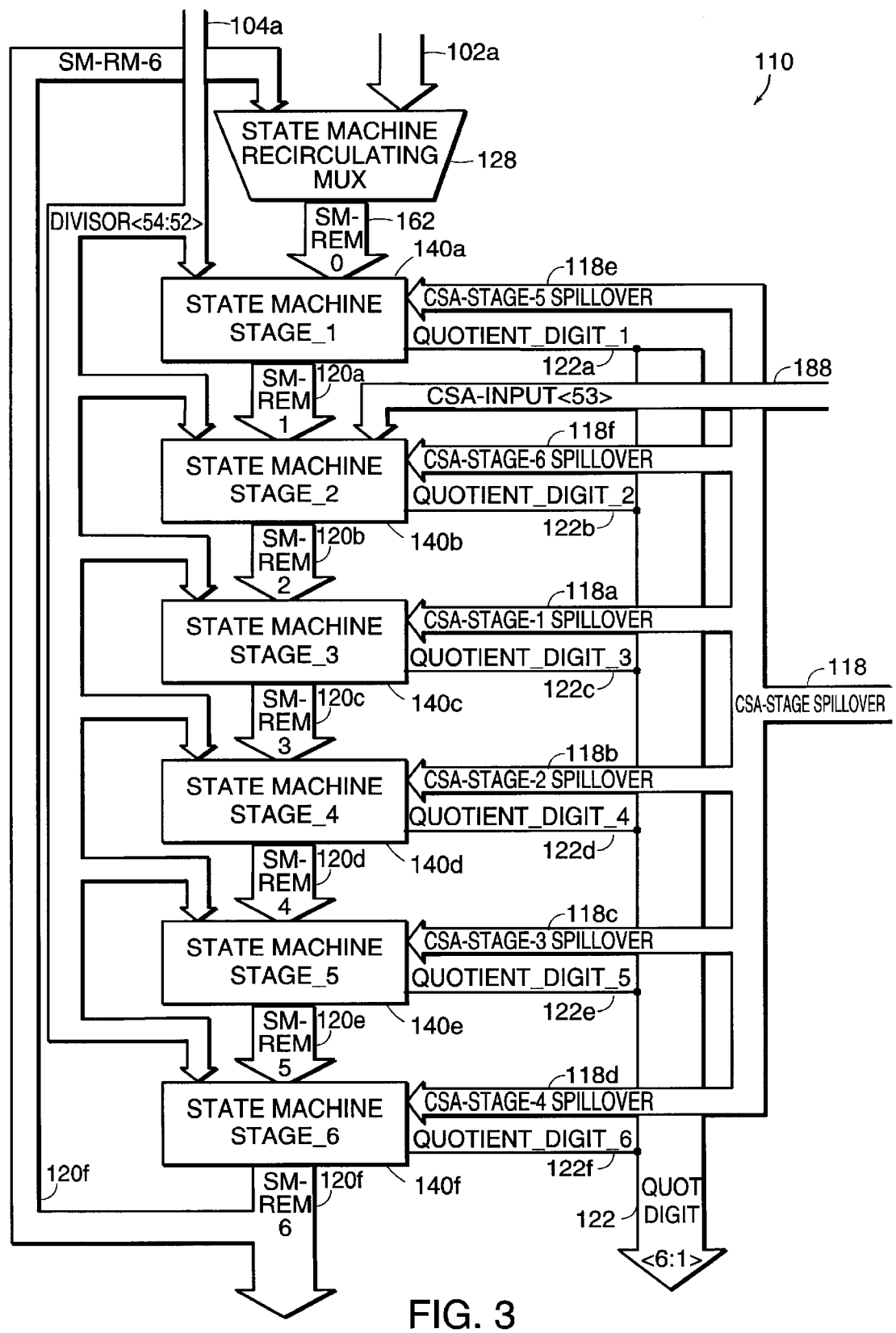
FIG. 3 is a block diagram of the state machine of the embodiment shown in FIG. 2.

Referring now to FIG. 3, the state machine 110 shown in FIG. 2 includes six similar state machine stages 140*a*–140*f* and a state machine recirculating multiplexor 128. Each state machine stage 140*a*–140*f* generates a respective quotient digit 122*a*–122*f* and a respective state machine partial remainder 120*a*–120*f*.

The state machine recirculating multiplexor 128 determines the partial remainder 162 input to state machine stage_1 140*a*. The partial remainder 162 is either the dividend's MSBs 102*a* or the state machine partial remainder 120*f* from the state machine stage_6 140*f*. In the first state machine cycle of a mathematical division operation, the dividend's MSBs 102*a* are selected. In subsequent state machine cycles, the state machine partial remainder 120*f* from state machine stage_6 is selected.

A state machine partial remainder 162, 120*a*–120*f* is input to each state machine stage 140*a*–140*f*. The state machine stage 140*a*–140*f* outputs a quotient digit 122*a*–122*f* and a state machine partial remainder 120*a*–120*f*. The state machine partial remainder 120*a*–120*f* output from the state machine stage 140*a*–140*f* is determined by the state machine partial remainder 120*a*–120*f* input to the state machine stage 140*a*–140*f* and the divisor's MSBs 104*a*. The CSA spillover signals 118*a*–118*f* from the CSA array 112 are added to the state machine partial remainder 120*a*–120*f* The state machine partial remainder 120*a*–120*f* output from the state machine stage 140*a*–140*f* is fed to the state machine partial remainder input 120*a*–120*f* of the subsequent state machine stage 140*a*–140*f*.

Figure 5:
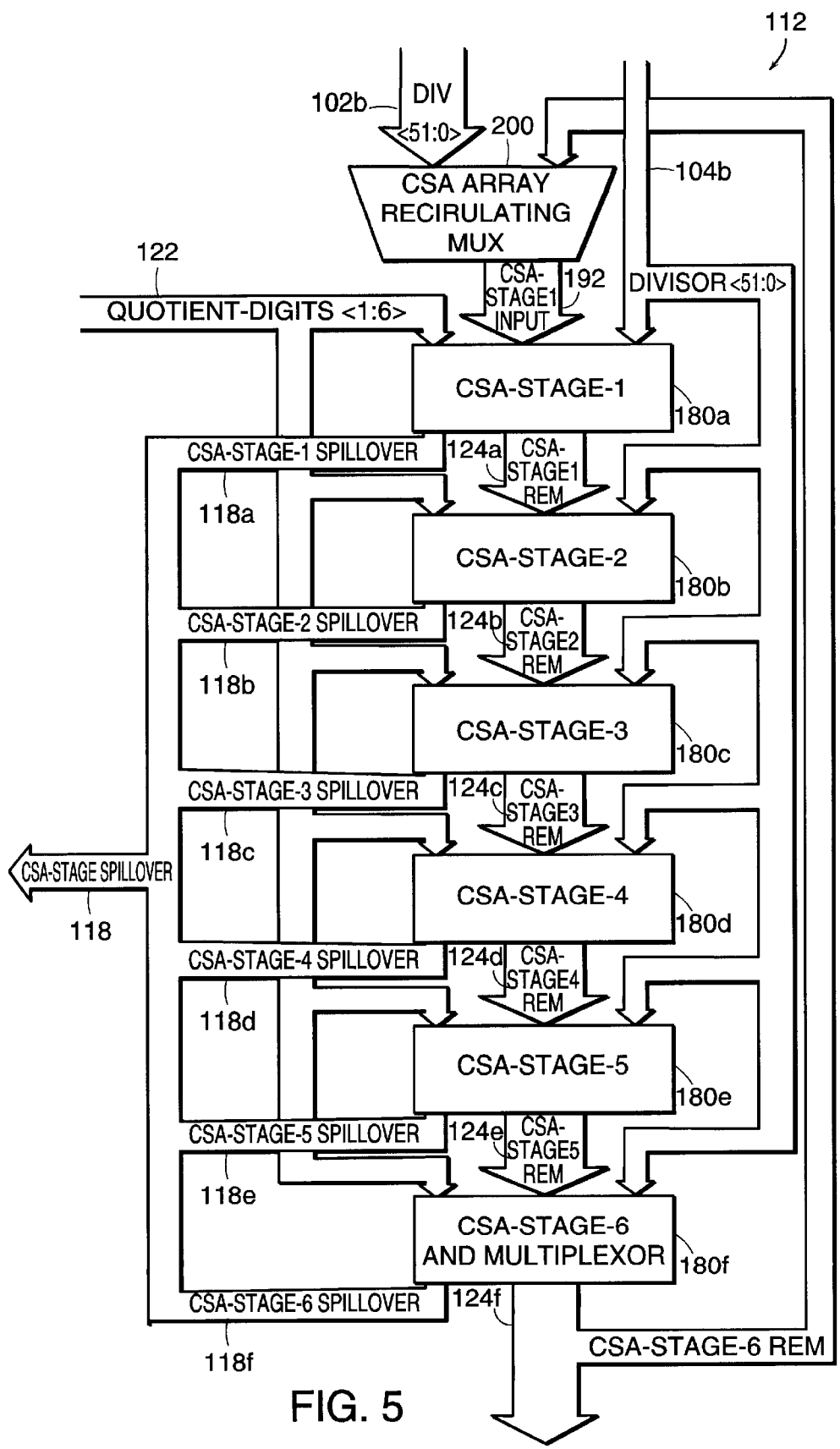
FIG. 5 is a block diagram of any of the stages in the state machine of the embodiment shown in FIG. 3.

The state machine 110 makes quotient digit 122*a*–122*f* decisions without knowledge of the CSA array partial remainder 124*f* in the CSA array 112. The CSA spillover signals 118a–118f are not input to their respective state machine stages 140a–140f but are input to the state machine 110 two state machine stages 140a–140f later. For example, as shown in FIG. 5, CSA spillover signals 118a from CSA array stage__1 180a, are input to state machine stage__3 140c. Referring again to FIG. 3, the delay of two state machine stages 140a–140f is not limited to two state machine stages. The number of state machine stages 140a–140f to delay is dependent on the speed of the state machine stages as compared to the CSA array stages 180a–180f shown in FIG. 5.

Referring again to FIG. 3, delaying the addition of the CSA spillover signals 118a–181f to the state machine stages 140a–140f increase the speed of the divider 100. For example, state machine stage__1 140a does not have to wait for CSA spillover signals 118a to be generated by the CSA array 112 in order to generate quotient digit 122a. The CSA spillover signals 118a from the CSA array 112 are available by the time the state machine 110 requires them in state machine stage__3 140c.

Figure 4:
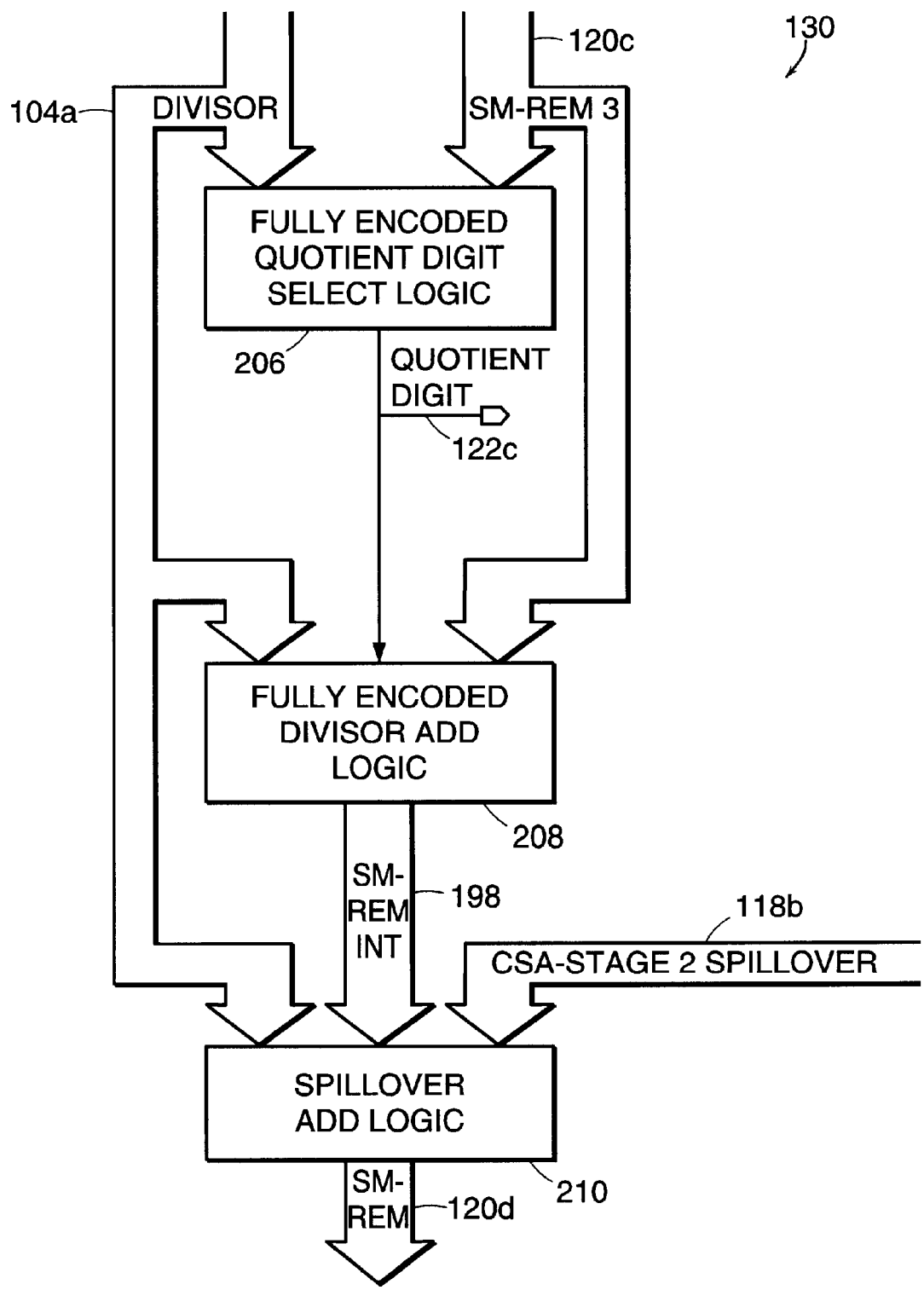
FIG. 4 is a block diagram of the CSA array of the embodiment shown in FIG. 2.

Referring now to FIG. 4, where any one of the state machine stages 140a–140f shown in FIG. 3. is further explained. For purposes of illustration FIG. 4 refers to state machine stage__4 140d, but state machine stages 140a–140c and 140e–140f are understood to operate similarly. Each state machine stage 140a–140f includes a fully encoded quotient digit select logic 206, fully encoded divisor add logic 208 and spillover add logic 210. For each possible combination of state machine partial remainder 120c and divisor's MSBs 104a, a value for the quotient digit 122c is encoded in the fully encoded quotient digit select logic 206. For illustrative purposes, the quotient digits 122 are selected from the redundant binary set {−1, 0, 1} and encoded using the standard non-restoring routine or procedure in Table 6. The quotient digits may be selected from any other redundant binary set, for example, the redundant binary set {−2, −1, 0, 1, 2}.

If $(R_i >= 0.5 Divisor); Q_i = 1$

If $(0 < R_i < 0.5 Divisor); Q_i = 1, 0$

If $(-0.5 Divisor < R_i < 0); Q_i = -1, 0$

If $(-0.5 Divisor <= R_i); Q_i = -1$ where $R_i$=partial remainder; $Q_i$=quotient digit Table 6

For example, if the divisor's MSBs 104a=1.10 and the state machine partial remainder 120c is set to values from −1.11 to 1.11, all possible combinations of state machine partial remainder 120c and divisor's MSBs 104a are encoded as shown in Table 7. Table 7 also shows the quotient digit 122c encoded for each combination of divisor's MSBs 104a and state machine partial remainder 120c using the quotient selection routine in Table 6. If the state machine partial remainder 120c =1.00 the fully encoded quotient digit select logic 206 outputs a quotient digit 122c=−1 as shown in Table 7.

TABLE 7

| Partial remainder | Quotient Digit |
|---|---|
| −1.11 | 1 |
| −1.10 | 1 |

TABLE 7-continued

| Partial remainder | Quotient Digit |
|---|---|
| −1.01 | 1 |
| −1.00 | 1 |
| −0.11 | 1 |
| −0.10 | 0 |
| −0.01 | 0 |
| 0.00 | 0 |
| 0.01 | 0 |
| 0.10 | 0 |
| 0.11 | 0 |
| 1.00 | −1 |
| 1.01 | −1 |
| 1.10 | −1 |
| 1.11 | −1 |

The inputs to the fully encoded divisor add logic 208 are the input state machine partial remainder 120c, divisor's MSBs 104a and quotient digit 122c. The output to the fully encoded divisor add logic 208 is the next state machine partial remainder 198. The next state machine partial remainder 198 is dependent on the inputs to the fully encoded divisor add logic 208. The next state machine partial remainder 198 for each possible combination of inputs is determined according to the standard non-restorative routine shown in Table 8. The fully encoded divisor add logic 208 is fully encoded with the next state machine partial remainder 198 for each possible combination of the inputs.

$$R_{i+1} = 2*(R_i - Q_i Divisor)$$

where $R_i$=partial remainder; $Q_i$=quotient digit; $R_{i+1}$=next partial remainder.

Table 8

For example, if the divisor's MSBs 104a=1.10 and state machine partial remainder 120c is set to values from −1.11 to 1.1, there are fifteen possible combinations shown in Table 9. The output state machine partial remainders 120d are fully encoded in the fully encoded divisor add logic 208 for a divisor of 1.10 with the values shown in Table 9. The state machine partial remainder 120c is input to the fully encoded quotient digit select logic 206. If the state machine partial remainder 120c=1.00 the fully encoded quotient digit select logic 206 outputs a quotient digit 122c=−1 as shown in Table 7. The fully encoded divisor add logic 208 outputs the fully encoded intermediate remainder 198 set equal to −1.00 according to Table 9.

TABLE 9

| Partial remainder(input) | Quotient Digit | Partial remainder(output) |
|---|---|---|
| −1.11 | 1 | −0.10 |
| −1.10 | 1 | 0.00 |
| −1.01 | 1 | 0.10 |
| −1.00 | 1 | 1.00 |
| −0.11 | 0 | −1.10 |
| −0.10 | 0 | −1.00 |
| −0.01 | 0 | −0.10 |
| 0.00 | 0 | 0.00 |
| 0.01 | 0 | 0.10 |
| 0.10 | 0 | 1.00 |
| 0.11 | 0 | 1.10 |
| 1.00 | −1 | −1.00 |
| 1.01 | −1 | −0.10 |

TABLE 9-continued

| Partial remainder(input) | Quotient Digit | Partial remainder(output) |
|---|---|---|
| 1.10 | −1 | 0.00 |
| 1.11 | −1 | 0.10 |

The next state machine partial remainder 198 from the fully encoded divisor add logic 208 is input to the spillover add logic 210. In the spillover add logic 210, the CSA spillover signals 118 from a respective stage of the CSA array 112 are added to the output state machine partial remainder 198. A CPA is not required to perform mathematical addition of the CSA spillover signals 118 to the output state machine partial remainder 198 because all possible state machine partial remainders 120c are encoded in spillover add logic 210. As illustrated in FIG. 4 the result of the mathematical addition is already encoded in the state machine stage 140d and is output as the state machine partial remainder 120d.

If the CSA stage__2 spillover signals 118b are zero, the state machine partial remainder 120d is the same as the next state machine partial remainder 198. If the CSA stage__2 spillover signals 118b are not zero, the state machine partial remainder 120d is the next possible encoded partial remainder in the state machine stage 140d. For example, setting the next state machine partial remainder 198=1.00, the state machine partial remainder 120d is determined from the encoded partial remainders in Table 9. If the CSA stage__2 spillover signals 118b are zero, the state machine partial remainder 120d=−1.00. If the CSA stage__2 spillover signals 118b are not zero, the state machine partial remainder 120d=−0.10.

Referring again to FIG. 3, having described the operation of any one of the state machine stages 140a–140f, the operation of the state machine 110 is described using the numerical example shown in Table 10. Table 10 shows the first six state machine stages 140a–140f of dividing dividend=1.01 by divisor=1.10 in the state machine 110.

TABLE 10

| State Machine Stage | Partial remainder Partial remainder(in) | Partial remainder | Quotient Digit |
|---|---|---|---|
| 1 | 1.01 | −0.10 | 1 |
| 2 | −0.10 | −1.00 | 0 |
| 3 | −1.00 | 1.00 | −1 |
| 4 | 1.00 | −1.00 | 1 |
| 5 | −1.00 | 1.00 | −1 |
| 6 | 1.00 | −1.00 | 1 |

The state machine 110 is fully encoded for the seventeen possible combinations of state machine partial remainder 120 f and divisor's MSBs 104a shown in Table 9. CSA spillover signals 118 from the CSA array 112 are zero. The dividend's MSBs 102a=1.01. The divisor's MSBs 104a= 1.10. The state machine recirculating multiplexor 128 determines whether the dividend's MSBs 102a or the partial remainder 120f is the selected partial remainder 162. In the first cycle through the state machine stages 140a=140f, the dividend's MSBs 102a are selected. In subsequent cycles, the state machine partial remainder 120f from state machine stage__6 140f is selected.

Continuing with the example of Table 10, the partial remainder input 162 to state machine stage__1 140a is 1.01. State machine stage__1 140a is fully encoded with all possible combinations of partial remainder 162 and divisor's MSBs 104a shown in Table 7 and Table 9. State machine stage__1 140a sets quotient digit__1 122a to −1 according to the fully encoded quotient digit values in Table 7. State machine stage__1140a sets state machine partial remainder 120a to −0.10 according to the fully encoded partial remainders in Table 9.

The state machine partial remainder input 120a to state machine stage__2 140b is −0.10. State machine stage__2 140b is fully encoded with all possible combinations of state machine partial remainder 120a and divisor's MSBs 104a shown in Table 7 and Table 9. State machine stage__2 140b sets quotient digit__2 122b to 0 according to the fully encoded quotient digit values in Table 7. State machine stage__2 140b adds the MSB bit of the dividend 188 input to the CSA array 112 plus the CSA spillover signals 118f from the CSA array 112 to the state machine partial remainder 120b. State machine stage__2 140b sets state machine partial remainder 120b to −1.00 according to the fully encoded partial remainders in Table 9.

The state machine partial remainder input 120b to state machine stage__3 140c is −1.00. State machine stage__3 140c is fully encoded with all possible combinations of state machine partial remainder 120b and divisor's MSBs 104a shown in Table 7 and Table 9. State machine stage__3 140c sets quotient digit__3 122c to 1 according to the fully encoded quotient digit values in Table 7. State machine stage__3 140c adds the CSA spillover signals 118a from the CSA array 112 to the state machine partial remainder 120c. State machine stage__3 140c sets state machine partial remainder 120c to 1.00 according to the fully encoded partial remainders in Table 9.

The state machine partial remainder input 120c to state machine stage__4 140d is 1.00. State machine stage__4 140d is fully encoded with all possible combinations of state machine partial remainder 120c and divisor's MSBs 104a shown in Table 7 and Table 9. State machine stage__4 140d sets quotient digit__4 122d to −1 according to the fully encoded quotient digit values in Table 7. State machine stage__4 140d adds the CSA spillover signals 118b from the CSA array 112 to the state machine partial remainder 120d. State machine stage__4 140d sets state machine partial remainder 120d to −1.0 according to the fully encoded partial remainders in Table 9.

The state machine partial remainder input 120d to state machine stage__5 140e is −1.00. State machine stage__5 140e is fully encoded with all possible combinations of state machine partial remainder 120d and divisor's MSBs 104a shown in Table 7 and Table 9. State machine stage__5 140e sets quotient digit__5 122e to 1 according to the fully encoded quotient digit values in Table 7. State machine stage__2 140e adds the CSA spillover signals 118e from the CSA array 112 to the state machine partial remainder 120e. State machine stage__5 140e sets state machine partial remainder 120e to 1.00 according to the fully encoded partial remainders in Table 9.

The state machine partial remainder input 120e to state machine stage__6 140f is 1.00. State machine stage__6 140f is fully encoded with all possible combinations of state machine partial remainder 120e and divisor's MSBs 104a shown in Table 7 and Table 9. State machine stage__6 140f sets quotient digit__6 122f to −1 according to the fully encoded quotient digit values in Table 7. State machine stage__6 140f adds the CSA spillover signals 118d from the CSA array 112 to the state machine partial remainder 120f. State machine stage__6 140f sets state machine partial remainder 120f to −1.00 according to the fully encoded partial remainders in Table 9.

After the six quotient digits 122a–122f have been generated, one cycle of the state machine 110 is complete. To generate more than six quotient digits, the state machine partial remainder 120f is fed back to state machine stage__1 140a through the state machine recirculating multiplexor 128. For example, to generate the fifty six quotient digits for double precision floating point division requires 10 cycles through the six stage state machine 110 of FIG. 5.

Referring now to FIG. 5, the CSA array 112 in the embodiment shown in FIG. 2 includes six CSA stages 180a–180f. The number of CSA stages 180a–180f implemented in the embodiment shown is equal the number of state machine stages 140a–140f implemented in the state machine 110. Each of the CSA stages 180a–180f includes a CSA adder and a multiplexor for each of the dividend's LSBs 102b. The multiplexor is used to select the divisor's LSBs 104b to be input to the CSA adder dependent on the quotient digits 122 from the state machine 110. The multiplexors and CSA adders used in the CSA array 112 are those that are well known in the art. A CSA adder outputs two signals, a sum and a carry. Both the sum and the carry signals from the CSA adder are output as the CSA array partial remainder 124a–f. The sum and carry signals from the CSA adder are referred to as a bit of the CSA partial remainder 124a–f.

The inputs to any CSA stage 180a–180f includes the CSA array partial remainder 124a–f, the divisor's LSBs 104b and the quotient digits 122a–f from the state machine 110. Each CSA adder in each CSA stage 180a–80f sums the output from the multiplexor and a respective bit of the CSA array partial remainder 124a–f. The result of the summation is a respective bit of the CSA array partial remainder 124a–f. In every CSA array stage 180a–180f, a left shift of the CSA array partial remainder 124a–124f occurs. The left shift produces CSA spillover signals 118a–118f. The spillover signals 118a–118f are added in the state machine 110 as previously discussed.

The dividend's LSBs 102b and the CSA array partial remainder 124f are input to the CSA array recirculating multiplexor 200. The CSA array recirculating multiplexor 200 selects which of the inputs is output to the CSA array partial remainder 192. The CSA array partial remainder 192 is input to CSA stage__1 180a. In the first cycle through the CSA array 112, the dividend's LSBs 102b are selected. In subsequent cycles through the CSA array 112, the CSA array partial remainder 124f is selected.

The numerical example shown in Table 11 is provided to illustrate the operation of the CSA array 112 in parallel with the state machine 110. The example division operation is to divide dividend 102=1.010001 by a divisor=1.100000001. The dividend 102 and the divisor 104 are split. The dividend's MSBs 102a=1.01 and the divisor's MSBs 104a=1.10 are input to the state machine 110. The dividend's LSBs 102b=0001 and the divisor's LSBs 104b=0000001 are input to the CSA array 112. The state machine partial remainders 120a–f and quotient digits 122 are identical to those shown in Table 10 for division stages 1 through 5. In stage 6, the CSA spillover signals 118d from the CSA array 112 are not zero. After adding the CSA spillover signals 118d, the state machine partial remainder 120=−0.10. If the spillover signals were zero, the partial remainder 120f would have been −1.00, the same as in Table 10. As can be seen from Table 9, −0.10 is the state machine partial remainder 120f value for quotient digit −1 and input partial remainder 1.01.

TABLE 11

| Division Stage | Partial remainder SM Rem.(In) | SM Rem.(Out) | Quot. Digit | Spillover |
|---|---|---|---|---|
| 1 | 1.01 | −0.10 | −1 | 0 |
| 2 | −0.01 | −1.00 | 0 | 0 |
| 3 | −1.00 | 1.00 | 1 | 0 |
| 4 | 1.00 | −1.00 | −1 | 0 |
| 5 | −1.00 | 1.00 | 1 | 1 |
| 6 | 1.00 | −0.10 | −1 | 1 |

Figure 6:
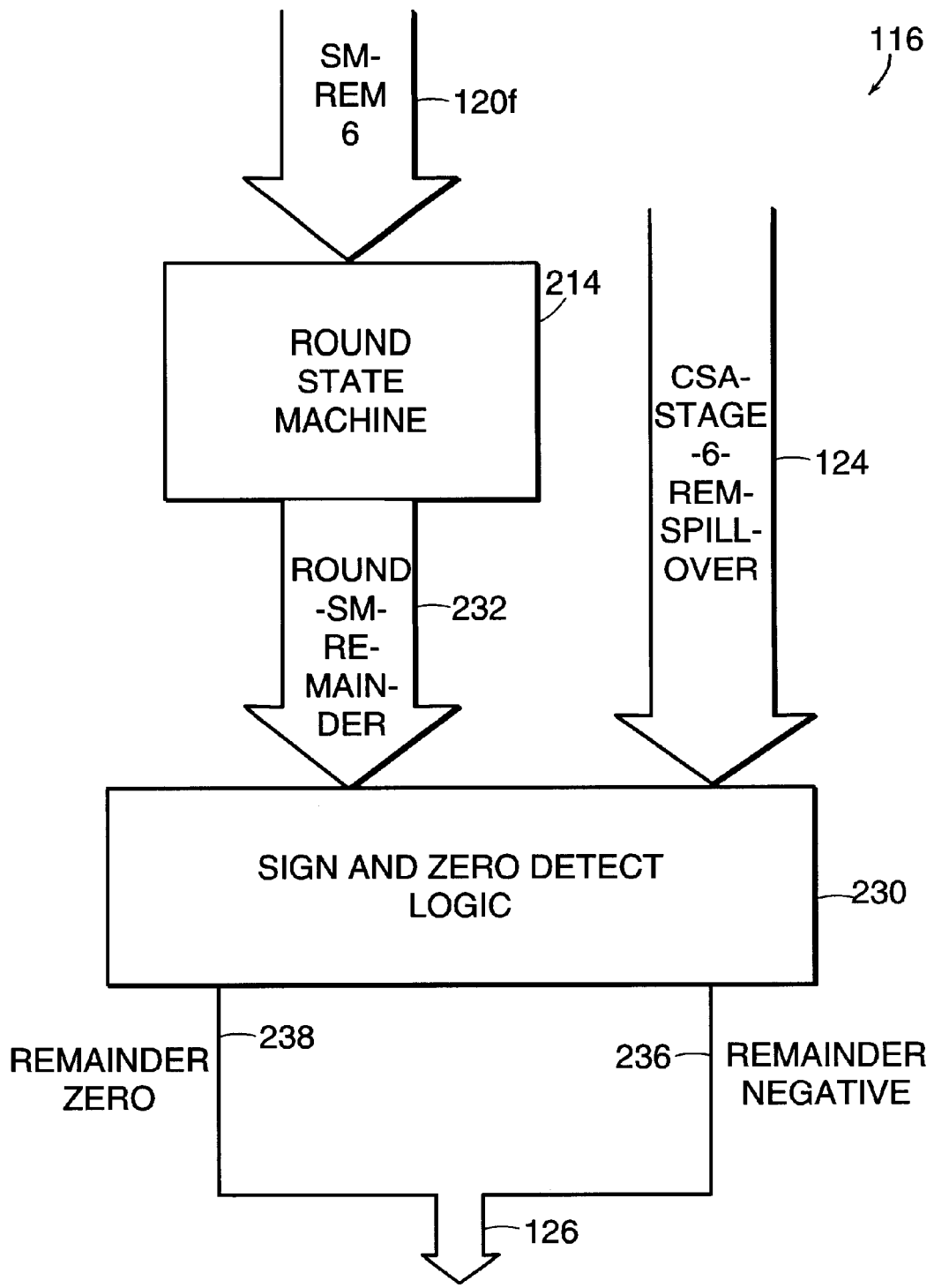
FIG. 6 is a block diagram of the cumulative remainder logic of the embodiment shown in FIG. 1.

Referring now to FIG. 6, the state machine partial remainder 120f is merged with the CSA array partial remainder 124f in the sign and zero detect logic 230. The sign and zero detect logic 230 determines if the merged remainder is negative, zero or positive. The remainder negative signal 236 is output from the sign and zero detect logic 230 and indicates whether the merged remainder is negative. The remainder zero signal 238 is output from the sign and zero detect logic 230 and indicates whether the merged remainder is zero. If the remainder negative signal 236 and the remainder zero signal 238 are both false, the merged remainder is positive. The combined Negative/Zero signals 126 are output to the cumulative quotient logic 114(FIG. 1).

Figure 7:
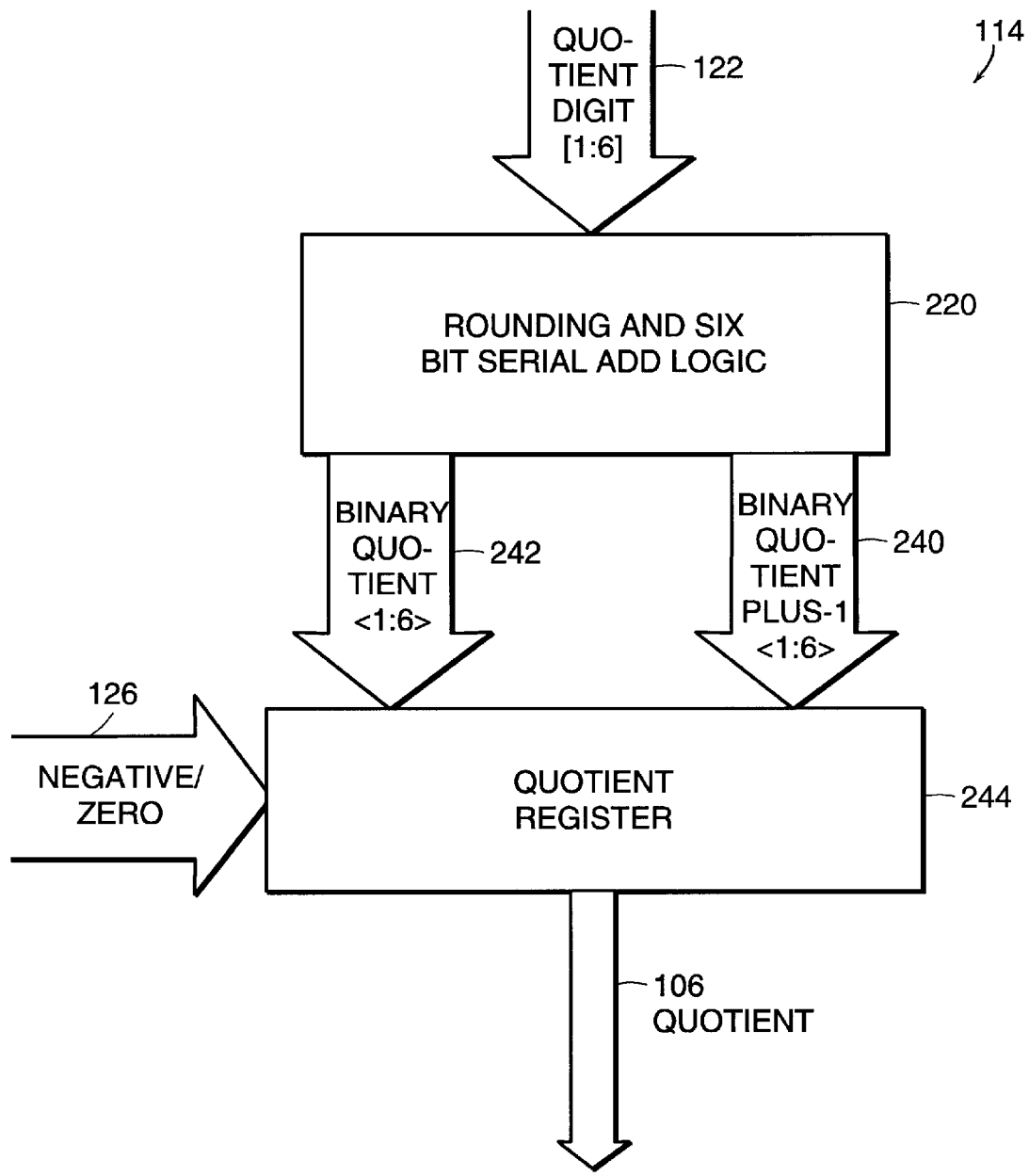
FIG. 7 is a block diagram of the cumulative quotient logic of the embodiment shown in FIG. 1.

Referring now to FIG. 7, the cumulative quotient logic 114 includes rounding and six bit serial add logic 220 and a quotient register 244. The quotient digits 122 from the state machine 110 are input to the rounding and six bit serial add logic 220. The rounding and six bit serial add logic 220 converts the quotient digits 122 from the redundant binary set {−1, 0, 1} to quotient digits 122 from the binary set {0,1}.

Two six bit quotients 240, 242 are output from the rounding and six bit serial add logic 220. The two six bit quotients 240, 242 are input to the quotient register 244. The quotient register 244 determines the quotient 106 dependent on each set of two six bit quotients 240, 242 output from the rounding and six bit serial add logic 220 and the negative zero signals 126 from the cumulative remainder logic.

The number of six bit quotients 240, 242 to add is dependent on the size of the quotient 106. For example, to generate a double-precision floating point quotient five sets of the two six bit quotients 240, 242 i.e. a total of sixty bits are added together to provide a fifty-five bit quotient. In the embodiment shown, the quotient bits 240, 242 are added six bits at a time but this is not required. For example, they may be added twenty-five bits at a time or fifty-four bits at a time.

As a result of the foregoing, the speed of the division operation in the present invention is increased through the use of fast comparison in the fully encoded state machine 110 and fast CSAs in the CSA array 112(FIG. 2).

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. In a computer system, apparatus for performing a division operation having a dividend mathematically divided by a divisor, producing a quotient digit and a partial remainder, the dividend, divisor and partial remainder each comprising respective least significant bits and most significant bits, the apparatus comprising:

a carry save adder array, comprising at least one carry save adder array stage, the carry save adder array stage comprising a different carry save adder for each least significant bit in the dividend, each carry save adder summing (i) a respective least significant bit of the dividend, and (ii) a respective least significant bit of the divisor; and a state machine coupled in parallel to the carry save adder array, for holding the most significant bits of the dividend and the most significant bits of the divisor, the state machine comprising at least one state machine stage having fully encoded partial remainder values and quotient digit values for all possible combinations of the most significant bits of the dividend and the most significant bits of the divisor, and each state machine stage providing the quotient digit and the most significant bits of the partial remainder dependent on the most significant bits of the dividend and the most significant bits of the divisor.

2. Apparatus as claimed in claim 1, wherein the carry save adder array stage generates spillover signals, and the state machine stage provides the most significant bits of the partial remainder dependent on the spillover signals.

3. Apparatus as claimed in claim 2, wherein the state machine stage further comprises spillover add logic which provides the most significant bits of the partial remainder by selecting an encoded partial remainder set equal to a result of a mathematical addition of the spillover signals, most significant bits of the dividend and the most significant bits of the partial remainder.

4. Apparatus as claimed in claim 1, wherein the most significant bits of the partial remainder are fed back to an input of the state machine stage.

5. Apparatus as claimed in claim 1, wherein each state machine stage is fully encoded for the quotient digit from the set minus two, minus one, zero, one and two.

6. Apparatus as claimed in claim 1, wherein each state machine stage is fully encoded for the quotient digit from the set minus one, zero and one.

7. Apparatus as claimed in claim 6, wherein each state machine stage is fully encoded such that:
  if the partial remainder is greater than half the divisor, then the state machine stage outputs the quotient digit set equal to minus one;
  if the partial remainder is less than or equal to half the divisor, then the state machine stage outputs the quotient digit set equal to zero or one;
  if the partial remainder is greater than or equal to negative half the divisor, then the state machine stage outputs the quotient digit set equal to zero or minus one; and
  if the partial remainder is less than negative half the divisor, then the state machine stage outputs the quotient digit set equal to one.

8. Apparatus as claimed in claim 1, wherein the state machine holds four most significant bits of the dividend and four most significant bits of the divisor.

9. Apparatus as claimed in claim 1, wherein the number of state machine stages is equal to the number of carry save. adder array stages.

10. Apparatus as claimed in claim 8, wherein the number of state machine stages is six.

11. In a computer system, a method for performing a division operation, having a dividend mathematically divided by a divisor, producing a quotient digit and a partial remainder, the dividend, divisor and partial remainder each comprising respective least significant bits and most significant bits, comprising the steps of:
  providing at least one carry save adder array, the carry save adder array comprising a carry save adder array stage, the carry save adder array stage comprising a different carry save adder for each least significant bit in the dividend;
  providing a state machine coupled in parallel to the carry save adder array, for holding the most significant bits of the dividend and the most significant bits of the divisor, the state machine comprising at least one state machine stage;
  summing in each carry save adder (i) a respective least significant bit of the dividend, and (ii) a respective least significant bit of the divisor;
  encoding partial remainder values and quotient digit values for all possible combinations of the most significant bits of the dividend and the most significant bits of the divisor in the state machine stage; and
  selecting the most significant bits of the partial remainder and the quotient digit depending on the most significant bits of the divisor and the most significant bits of the dividend.

12. The method of claim 11, wherein the step of summing further comprises generating spillover signals; and
  the step of selecting further comprises adding the spillover signals.

13. The method of claim 12, wherein the step of adding the spillover signals further comprises:
  selecting an encoded partial remainder set equal to a result of a mathematical addition.

14. The method of claim 11, further comprising the step of:
  sending the most significant bits of the partial remainder to an input of the state machine stage.

15. The method of claim 11, wherein the step of providing a state machine further comprises:
  holding the four most significant bits of the dividend and the four most significant bits of the divisor in the state machine.

16. The method of claim 11, where in the step of encoding further comprises fully encoding the quotient digit from the set minus two, minus one, zero, one and two.

17. The method of claim 11, wherein the step of encoding further comprises fully encoding the quotient digit from the set minus one, zero and one.

18. The method of claim 17, wherein the step of encoding includes:
  if the partial remainder is greater than half the divisor, then outputting from the state machine stage the quotient digit set equal to minus one,
  if the partial remainder is less than or equal to half the divisor and greater than or equal to negative half the divisor, then outputting from the state machine stage the quotient digit set equal to zero, minus one or one; and
  if the partial remainder is less than negative half the divisor, then outputting from the state machine stage the quotient digit set equal to one.

19. The method of claim 11, wherein the step of providing a carry save adder array includes providing multiple save adder array stages; and
  the step of providing a state machine includes providing a number of state machine stages equal to the number of carry save stages.

20. The method of claim 19, wherein the number of state machine stages is six and the number of carry save adder array stages is six.

* * * * *